United States Patent

[11] 3,540,469

[72] Inventor David P. Ward
P.O. Box 5323, Dallas, Texas 75222
[21] Appl. No. 802,474
[22] Filed Feb. 26, 1969
[45] Patented Nov. 17, 1970

[54] EXCESS FLOW CHECK VALVE
15 Claims, 7 Drawing Figs.
[52] U.S. Cl. .................................................. 137/512.1,
137/512.2, 137/517
[51] Int. Cl. ........................................... F16k 17/30
[50] Field of Search ............................................ 137/498,
517, 460, 543, 512.1, 512.2

[56] References Cited
UNITED STATES PATENTS
1,153,770 9/1915 Daymon ...................... 137/512.1
2,926,046 2/1960 Blair ............................ 137/517X
2,968,315 1/1961 Fisher .......................... 137/517

FOREIGN PATENTS
1,172,918 6/1964 Germany ...................... 137/498

Primary Examiner—M. Cary Nelson
Assistant Examiner—R. B. Rothman
Attorney—Schley and Schley ABSTRACT: Excess flow check valve for liquefied gaseous fluid, such as liquefied petroleum gas and anhydrous ammonia, handling equipment and particularly for safeguarding the withdrawal of such fluid from storage tanks. The valve has a two-stage closure to permit the sue of a weaker actuating spring, which is more sensitive and resilient, and a plurality of lateral ports, of relatively large area and minimum quantity, in its housing to separate the flow into smaller streams of sufficient area to minimize turbulence and provide substantially uniform closing of said valve irrespective of the flow area therearound. Preferably, the ports are of maximum dimensions to permit maximum controlled flow.

Patented Nov. 17, 1970

INVENTOR.
David P. Ward
BY Ashley & Ashley
ATTORNEYS

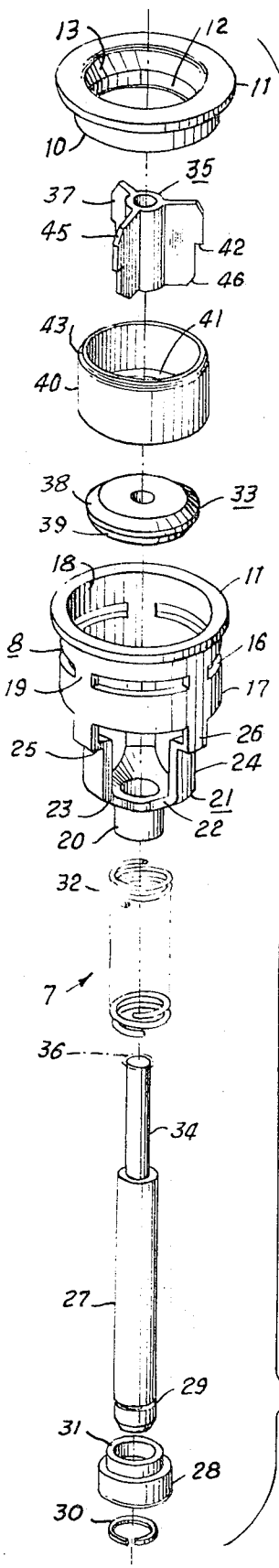
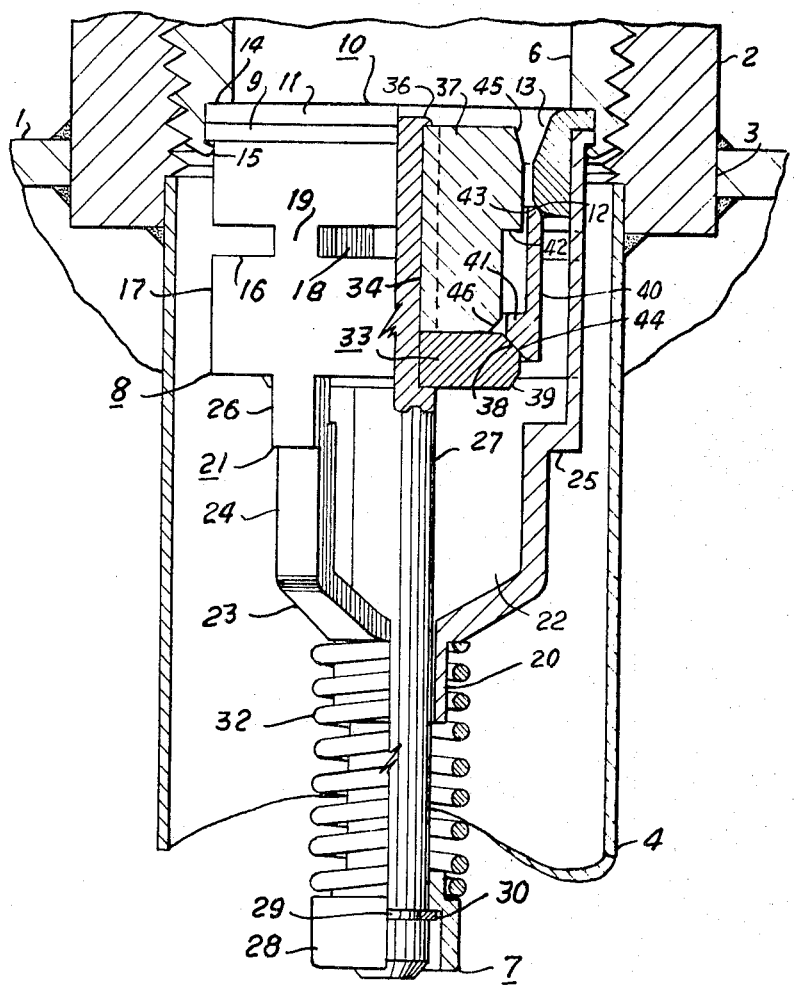
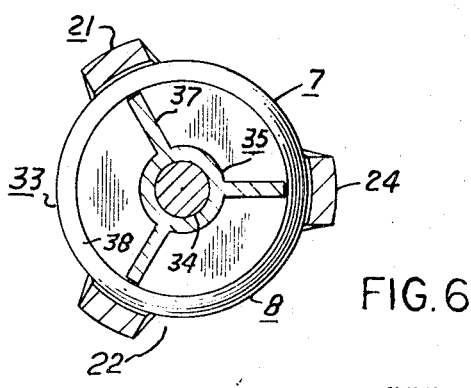

3,540,469

EXCESS FLOW CHECK VALVE

BACKGROUND OF THE INVENTION

1. Field of the Invention

Excess flow check valve for liquefied gaseous fluids handling equipment, such as the fill and eduction fittings of storage tanks.

2. Description of the Prior Art

The ever increasing demand for faster fluid transfer rates in various industries, such as the handling of liquefied gaseous fluids, including but not limited to liquefied petroleum gas and anhydrous ammonia, has made essential more efficient valves and fittings. The safety standards set by the governing bodies of these industries require an excess flow check valve of the spring-pressed type at each flow opening, except gauge and relief valve, of a storage tank or other container and, preferably, the check valve should be disposed within the interior of the tank. In some flow openings, a collar or half-pipe coupling is secured to provide an unrestricted area within the tank or other container for the mounting of a check valve. Usually, the fluid fill and eduction opening of a storage tank has a fill and eduction pipe or dip tube depending therefrom through the vapor space to the bottom of the tank to permit removal of the gaseous fluid in liquefied condition and this pipe or tube is suspended from the collar, a full pipe coupling or a special fitting having an enlarged interior portion. The general usage of dip tubes results in wide variations in the areas of the flow spaced around the exteriors of the excess flow check valves.

Although so-called "high flow" excess flow check valves have been available for several years, most of said valves are of the single-valve disk and seat type and have a comparatively high pressure drop across their seats during withdrawal as well as filling. One of the most undesirable characteristic of this type of valve is the effect that dip tubes, couplings and other fittings of different diameter, which surround the valve, have on the capacity of closing moment of said valve. The confinement of such a valve in a fitting of minimum diameter causes a much lower closing rate (gallons or cubic feet per minute) than when the same valve is mounted in the open vapor space of a storage tank or within a fitting of larger or optimum diameter. Accordingly, the area of the flow space immediately surrounding an excess flow check valve is a function of the capacity or closing moment of the valve or, conversely, said valve capacity or closing moment is a function of said flow space area.

SUMMARY OF THE INVENTION

This invention relates to a novel excess flow check valve for use in equipment for handling liquefied gaseous fluids, including but not limited to liquefied petroleum gas and anhydrous ammonia, and more particularly to safeguard the withdrawal of such fluids from a storage tank under vapor pressure in the tank. The check valve includes a valve assembly having a tubular member for engagement with an annular seat and a circular element for engagement with the tubular member whereby a two-stage closure for shutting off flow is provided to permit the use of an actuating spring of less strength as well as greater sensitivity and resiliency. A plurality of lateral ports, of relatively large area and minimum quantity, is formed in the housing of the valve to separate the flow into smaller streams of sufficient area to minimize turbulence and provide substantially uniform closing of said valve, the moment of which closing is not affected appreciably by the area of the flow space immediately surrounding said valve housing. The tubular valve member is reciprocal relative to the circular valve element and, in open position, is closer to the valve seat than to said element whereby said valve member engages said valve seat prior to being engaged by said valve element so as to reduce the flow area through the check valve. The portion of the valve housing adjacent the tubular valve member is enlarged to provide a flow space externally of said valve member and has a number of its ports above or outwardly of the open or unseated valve member to minimize restriction of flow between the exterior and interior of said housing.

Due to the relatively large area and minimum quantity of the lateral ports, substantially all of the circular valve element and at least a portion of the tubular valve member are exposed directly to the exterior of the valve housing. Preferably, the lateral ports are of maximum dimensions, being formed by narrow legs extending longitudinally of the valve housing, and are substantially coextensive with the length of said valve housing. Although it is preferable for the lateral ports to be formed by a first set of openings elongated circumferentially of the valve housing between the valve seat and the unseated tubular valve member and a second set of openings spaced from the first set in nonoverlapping relationship and of maximum dimensions longitudinally and circumferentially of said valve housing so as to be substantially coextensive with the travel of the circular valve element, said ports may be formed by a single set of continuous openings so as to expose substantially all of said valve member as well as said valve element directly to the exterior of said valve housing substantially throughout the travel of said member and element.

A construction designed to carry out the invention will be hereinafter described, together with other features of the invention.

BRIEF DESCRIPTION OF THE DRAWINGS

FIG. 3 is a view, similar to FIG. 2, showing the check valve in closed position, FIG. 4 is an exploded, perspective view of the check valve, FIG. 6 is a horizontal, cross-sectional view taken on the line 6—6 of FIG. 2.

DESCRIPTION OF THE PREFERRED EMBODIMENTS

Figures 1, 2, 5, 7:
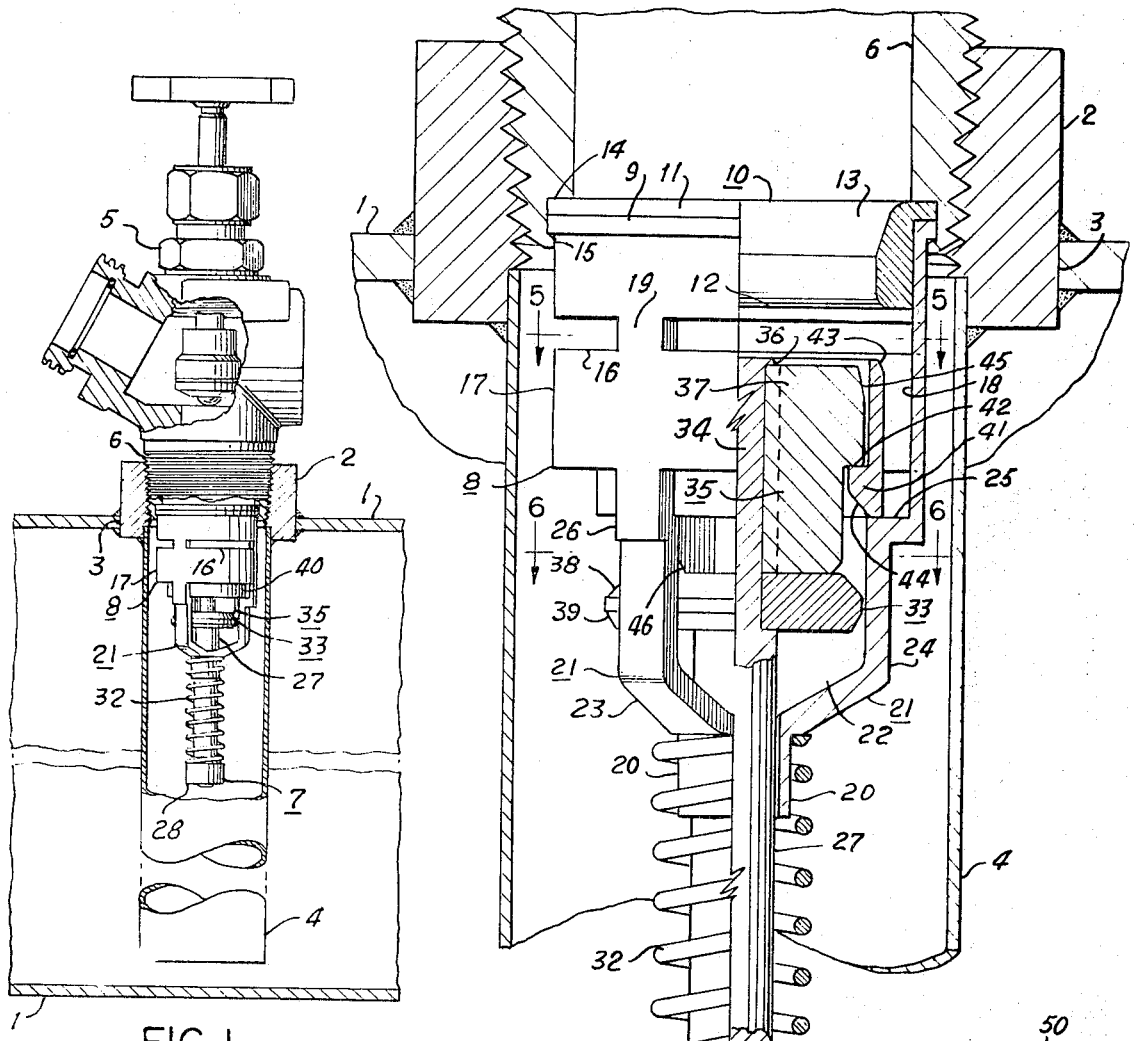
FIG. 1 is a transverse, vertical, sectional view, partly in elevation, of a portion of a storage tank having an excess flow check valve, in open position and constructed in accordance with the invention, secured to the lower end of a fluid fill and eduction control valve so as to depend into the upper end of a conventional dip tube.
FIG. 2 is an enlarged, transverse, vertical, sectional view, partly in elevation, of the open check valve and adjacent portions of the dip tube, control valve and tank.
FIG. 5 is a horizontal, cross-sectional view taken on the 5-—5 of FIG. 2.
FIG. 7 is a side elevational view of a slightly modified excess flow check valve.

In the drawings, the numeral 1 designates a portion of a storage tank for liquefied gaseous fluids, such as liquefied petroleum gas and anhydrous ammonia, having an internally screw-threaded collar or half-pipe coupling 2 secured in its fluid inlet-outlet opening 3. A fluid fill and withdrawal pipe 4, commonly referred to as a dip tube, may be secured to the lower end of the collar 2 and extend to the bottom portion of the tank 1 in the usual manner. The collar is adapted to support a liquid fill and eduction, manual control valve 5 which has its depending nipple 6 screw-threaded in the upper portion of said collar. An excess flow check valve 7, embodying the principles of the invention, is suspended from the control valve 5 so as to depend coaxially into the dip tube 4. Although dip tubes are desirable and preferable, many storage tanks are not provided with the same. In this event, the check valve need not be mounted vertically.

As best shown in FIGS. 2—4, the check valve 7 has a hollow, generally cylindrical body or housing 8, at the upper or outer end of which an external, radial, annular flange 9 is provided for supporting an internal, annular valve seat 10. A flange 11, overlying and complementary to the flange 9, is formed at the upper or outer end of the valve seat 10 which has an annular, beveled, internal seating face 12 at its lower or inner margin and which, preferably, has an internal, outwardly-flaring and beveled surface 13 at its upper or outer end portion. For connecting the check valve to the control valve, an internal, annular recess 14 is provided in the lower or inner end of the nipple 6 for receiving the nested flanges 9 and 11 on the upper or outer ends of the check valve housing 8 and valve seat. As shown at 15, the lower or inner extremity of the nipple is crimped or pinched radially inward so as to underlie and confine the flanges. It is noted, however, that the check valve 7 may be secured to the control valve 5 or in the collar 2 or tank opening 3 in any suitable manner.

Immediately below or inwardly of the valve seat 10, a plurality, preferably a trio, of identical, coplanar, circumferentially-extending slots or elongate ports 16 (FIG. 5) is formed in the tubular upper or outer portion or wall 17 of the check valve housing for establishing communication between the exterior of said housing and its bore 18. Preferably, the ports 16 are of maximum length and minimum quantity, being spaced equally by narrow, upright partitions or posts 19, so as to provide maximum flow areas within practicable limits. A tubular nipple or collar 20, of relatively small diameter, is provided at the lower or inner extremity of the housing 8 and is connected to the upper or outer portion or wall 17 thereof by a plurality of equally-spaced, upright, elongate members or legs 21 of narrow width. Preferably, the legs 21 are in alignment with the posts 19 so as to be of the same minimum quantity and function as a valve cage having flow passages, spaces or ports 22, of large or maximum area, therebetween. Each of the valve cage legs has an upwardly, outwardly inclined lower or inner portion 23, an elongate, upright intermediate portion 24 offset inwardly of the wall 17 of the housing, a transverse or horizontal portion 25 projecting radially outward of the upper or outer end of the intermediate portion, and an upper or outer portion 26 which is alined with said housing wall so as to form an extension thereof. Obviously, the transverse leg portions 25 provide upwardly or outwardly facing, internal shoulders.

An elongate, complementary valve stem 27 extends slidably through the collar 20 of the housing 8 (FIGS. 2—4) and has an annular spring follower 28, of larger internal diameter, mounted on its lower or inner end by a coacting groove 29 and snap ring 30. As shown at 31, the upper or outer end portion of the follower 28 is of reduced internal and external diameters to provide an upwardly or outwardly facing, external, radial shoulder for confining the lower or inner end of a helical compression spring 32 which has its upper or outer end surrounding the housing collar and bearing against the lower or inner leg portions 23 whereby the valve stem 27 is constantly urged downwardly or inwardly. For supporting a circular valve element or disk 33 within the cage formed by the legs 21, the valve stem has an upper or outer portion or shank 34 of reduced diameter to provide an upwardly or outwardly facing radial shoulder.

A guide member or spider 35 is confined upon the reduced shank 34, above or outwardly of and resting on or engaging the valve disk 33, by upsetting the upper or outer extremity 36 of said shank and has a plurality, preferably a trio, of upright, radial wings 37. The valve disk is of sufficient diameter to have a sliding fit within and be guided by the complementary internal surfaces of the intermediate leg portions 24. An annular, beveled seating face 38 is provided at the upper or outer margin of the disk 33 which, preferably, has a relieved lower or inner margin 39 so as to minimize flow turbulence therearound as well as facilitate downward or inward movement of said disk relative to the cage legs 21.

The guide spider 35 is adapted to slidably confine a tubular valve member or sleeve valve 40 which has an internal, radial flange 41 for engaging downwardly or inwardly facing shoulders 42 formed on the wings 37 of said spider by reducing the width of the lower or inner portions of said wings. An external, annular, beveled seating face 43 is provided at the upper or outer end of the sleeve valve 40 for complementary engagement with the lower or inner face 13 of the valve seat 10. The sleeve valve is of sufficient diameter to rest upon the internal marginal portions of the radial shoulders formed by the transverse leg portions 25 so as to be spaced an appreciable distance from the wall 17 of the valve housing 8 and thereby facilitate flow around the exterior of said sleeve valve.

Due to the force of the compression spring 32, the guide spider is constantly urged downwardly or inwardly to hold the shoulders 42 of its wings engaged with the flange 41 of the sleeve valve and said flange engaged with the radial shoulders of the legs 21. An internal, annular, beveled face 44 is provided at the lower or inner end of the internal flange of the sleeve valve for seating engagement with the face 38 of the valve disk 33. Since the guide spider is reciprocal with the valve stem 27 and valve disk relative to the sleeve valve 40 as well as the valve seat, manifestly, it is desirable to relieve the upper or outer and lower or inner external margins of each of the wings 37 as shown at 45 and 46.

When fluid is withdrawn from the tank 1, it flows upwardly or outwardly through the dip tube 4, excess flow check valve 7 and manual control valve 5. At normal withdrawal rates, the force of the compression spring 32 is sufficient to prevent the pressure drop across the valve disk 33 from lifting said seat whereby said spring maintains the check valve in its open position with said valve disk intermediate the ends of the valve cage legs 21 and ports 22 as shown in FIGS. 1 and 2. In addition to flowing around the valve cage legs and through the large ports into the bore 18 of the check valve housing 8 between the wings 37 of the guide spider 35 as well as around the valve sleeve 40, the fluid enters said bore through the slots 16 of the housing wall 17. Since these slots are upwardly or outwardly of the valve disk 33, it is readily apparent that the portion of the effluent fluid flowing through said slots has no effect upon said valve disk.

It is noted that the large ports and slots coact with each other as well as the guide wings and valve sleeve to divide the outflow, as well as inflow, into smaller, separate streams and control the size and effect of the efflux area of the check valve 7 as well as to substantially eliminate or greatly reduce the undesirable effect of the relatively restricted area of the dip tube upon the closing characteristics of said valve. Due to the large area of the ports 22, both longitudinally and circumferentially of the valve housing 8, the lower or inner portion of the flow passage formed by the bore 18 of said housing is in direct lateral as well as axial communication with the flow space exteriorly of said housing so as to reduce restriction of flow.

It is conventional to vary the strength of the compression spring in accordance with the desired rate of withdrawal of the fluid in gallons or cubic feet per minute. When the withdrawal rate exceeds the predetermined quantity, the pressure drop across the valve disk and sleeve valve overcomes the force of the spring 32 and compresses said spring so as to close the excess flow check valve. As shown in FIG. 3, the valve disk 33 and sleeve valve 40 move upwardly or outwardly of the tank 1 simultaneously with the valve stem 27 until the upper or outer face 43 of said sleeve valve seats against the lower or inner face 13 of the valve seat 10 due to the axial space between said complementary faces being less than the axial space between the complementary seating faces 38 and 44. Consequently, the valve disk continues to move upwardly or outwardly relative to the sleeve valve so as to seatingly engage the latter faces, this engagement holding the faces 13 and 43 in engagement. Usually, a minute vent opening (not shown) is provided in the sleeve valve to bleed off excessive pressure and facilitate subsequent opening of the check valve 7 after closing thereof.

Since the excess flow check valve is mounted at the lower or inner end of the control valve 5 so as to depend into the dip tube, it is protected from damage and prevents outflow in the event that said control valve is broken off or otherwise rendered inoperative. When in open position, the excess flow check valve has a low pressure drop across its valve disk and sleeve valve during withdrawal as well as filling so as to accommodate maximum flow. Due to the construction of the check valve 7, its moment of closing is substantially unaffected by variations in its mounting and said valve closes at substantially the same pressure drop irrespective of whether it is disposed within a dip tube or within the open vapor space of a storage tank which does not have a dip tube and regardless of the construction and size of the dip tube. The two-stage closing of the excess flow check valve provided by the sleeve valve and valve disk is of major importance in that less force is required for such closing whereby a compression spring of less strength as well as greater sensitivity and resiliency can be utilized.

As stated hereinbefore, the ports 22 are of minimum quantity and of maximum dimensions longitudinally and circumferentially of the valve housing 8 so as to expose substantially all of the valve disk 33 to the exterior of said housing substantially throughout the travel of said valve disk. It has been found that the separate formation and longitudinal spacing of the slots 16 from the ports are most desirable since the wall 17 of the valve housing is of sufficient circumferential area to partially shield the valve sleeve 40 throughout its travel from direct lateral exposure to the housing exterior and thereby prevent the closing characteristics of the check valve from being varied appreciably by the relatively restricted area of the dip tube 4.

It is noted, however, that the closing of the check valve 7 is less responsive than the closing of conventional check valves to variations in the flow space area exteriorly of the valve housing even when its wall is substantially eliminated as shown in FIG. 7 wherein a slightly modified embodiment of the invention is illustrated. This check valve 50 may be identical to the valve 7, except for the slots 16, legs 21 and ports 22 of the latter, and has longer legs 51 extending outwardly or upwardly past the valve disk to a point immediately inward of the outer, or below the upper, end or the valve. Due to the extended length of the legs 51, larger ports 52 are formed and are of greater longitudinal dimension so as to have an area equal to the combined areas of the slots 16 and ports 22 and the major portion of the valve housing wall 17. Although the larger ports 52 provide a greater flow area, the absence of most of the housing wall renders the modified valve 50 more responsive to variations in the exterior flow space whereby said valve is not as versatile as the check valve 7.

I claim:

1. An excess flow check valve including:
   a generally cylindrical housing having a passage therethrough;
   an annular valve seat at one end of the passage;
   internal shoulder means in said passage spaced from the valve seat;
   a valve stem extending coaxially of said passage;
   a valve element carried by the valve stem;
   a tubular valve member movable in said passage between the shoulder means and valve seat relative to the valve element and valve stem;
   means loosely connecting the tubular valve member to said valve stem in spaced relation to the valve element to limit relative movement of said valve member;
   said tubular valve member having a seating face complementary to said valve seat for engagement therewith and an opposed seating face for complementary engagement with said valve element;
   resilient means carried by said valve stem for urging said valve element away from said valve member and said member away from said valve seat;
   the housing having a plurality of lateral port means of relatively large area and minimum quantity for separating the flow between the exterior of said housing and its passage into smaller streams of sufficient area to minimize turbulence and provide substantially uniform closing of the valve irrespective of the exterior flow area; and
   the relatively large area and minimum quantity of the plurality of lateral port means exposing substantially all of said valve element and at least a portion of said valve member directly to the exterior of said housing.

2. An excess flow check valve as defined in claim 1 wherein the plurality of lateral port means includes:
   a first portion elongated circumferentially of the valve housing between the valve seat and tubular valve member in its unseated position; and
   a separate second portion spaced from the first portion in nonoverlapping relationship and of maximum dimensions longitudinally and circumferentially of said valve housing so as to be substantially coextensive with the travel of the valve element.

3. An excess flow check valve as defined in claim 2 wherein the tubular valve member is closer to the valve seat than to the valve element whereby said valve member engages said valve seat before said valve element engages said member upon closing of the valve.

4. An excess flow check valve as defined in claim 2 wherein the valve housing is spaced laterally from the tubular valve member to provide a flow space therebetween.

5. An excess flow check valve as defined in claim 2 wherein the plurality of lateral port means is formed by a plurality of narrow legs extending longitudinally of the valve housing.

6. An excess flow check valve as defined in claim 1 wherein the tubular valve member is closer to the valve seat than to the valve element whereby said valve member engages said valve seat before said valve element engages said member upon closing of the valve.

7. An excess flow check valve as defined in claim 6 wherein the valve housing is spaced laterally from the tubular valve member to provide a flow space therebetween.

8. An excess flow check valve as defined in claim 6 wherein the plurality of lateral port means is formed by a plurality of narrow legs extending longitudinally of the valve housing.

9. An excess flow check valve as defined in claim 6 wherein the plurality of lateral port means is continuous and substantially coextensive with the length of the valve housing from the valve seat to the opposite end of said housing.

10. An excess flow check valve as defined in claim 1 wherein the valve housing is spaced laterally from the tubular valve member to provide a flow space therebetween.

11. An excess flow check valve as defined in claim 1 wherein the plurality of lateral port means is formed by a plurality of narrow legs extending longitudinally of the valve housing.

12. An excess flow check valve as defined in claim 11 wherein the valve housing is spaced laterally from the tubular valve member to provide a flow space therebetween.

13. An excess flow check valve as defined in claim 1 wherein the plurality of lateral port means is continuous and substantially coextensive with the length of the valve housing from the valve seat to the opposite end of said housing.

14. An excess flow check valve as defined in claim 13 wherein the valve housing is spaced laterally from the tubular valve member to provide a flow space therebetween.

15. An excess flow check valve as defined in claim 13 wherein the plurality of lateral port means is formed by a plurality of narrow legs extending longitudinally of the valve housing.